US011550687B2

(12) United States Patent
O'Donnell et al.

(10) Patent No.: US 11,550,687 B2
(45) Date of Patent: Jan. 10, 2023

(54) USING MEMORY DEVICE SENSORS

(71) Applicant: Micron Technology, Inc., Boise, ID (US)

(72) Inventors: Cheryl M. O'Donnell, Boise, ID (US); Erica M. Gove, Boise, ID (US); Zahra Hosseinimakarem, Boise, ID (US); Debra M. Bell, Boise, ID (US); Roya Baghi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 299 days.

(21) Appl. No.: 16/707,906

(22) Filed: Dec. 9, 2019

(65) Prior Publication Data
US 2021/0173757 A1 Jun. 10, 2021

(51) Int. Cl.
G06F 11/30 (2006.01)
G06F 13/16 (2006.01)
G06F 11/32 (2006.01)
B60H 1/00 (2006.01)

(52) U.S. Cl.
CPC ...... G06F 11/3089 (2013.01); G06F 11/3058 (2013.01); G06F 11/3075 (2013.01); G06F 11/324 (2013.01); G06F 13/1668 (2013.01); B60H 1/00742 (2013.01)

(58) Field of Classification Search
CPC ............. G06F 11/3089; G06F 11/3058; G06F 11/3075; G06F 11/324; G06F 13/1668; G06F 11/3013; G06F 2201/81; G06F 11/30–3495; B60H 1/00; B60H 3/00
See application file for complete search history.

(56) References Cited

U.S. PATENT DOCUMENTS

| 6,453,218 B1 | 9/2002 | Vergis |
| 7,212,894 B2 * | 5/2007 | Hattori ................... B60N 2/002 |
| | | 701/45 |

(Continued)

FOREIGN PATENT DOCUMENTS

EP 0851427 7/1999

OTHER PUBLICATIONS

Abulkhair, Maysoon F., et al. "Sensor based hyperthermia alert car application." Int. J. Appl. Inf. Syst. 5.2 (2016): 44-55. (Year: 2016).*

(Continued)

*Primary Examiner* — Matthew J Brophy
(74) *Attorney, Agent, or Firm* — Brooks, Cameron & Huebsch, PLLC

(57) ABSTRACT

Systems, apparatuses, and methods related to using memory device sensors are described. Some memory system or device types include sensors embedded in their circuitry. For instance, another device can be coupled to a memory device with an embedded sensor. The memory device can transmit a signal representing sensor data generated by the embedded sensor using a sensor output coupled to the other device. A controller coupled to a memory device may determine one or more threshold values of a sensor or sensors embedded in a memory device. The memory device may transmit an indication responsive to one or more sensors detecting a value greater or less than a threshold and may transmit the indication to another device.

16 Claims, 7 Drawing Sheets

(56) References Cited

U.S. PATENT DOCUMENTS

| | | | |
|---|---|---|---|
| 7,309,970 B2* | 12/2007 | Gao | B60H 1/0073 |
| | | | 318/443 |
| 7,590,473 B2* | 9/2009 | Wyatt | G11C 5/00 |
| | | | 700/299 |
| 9,227,484 B1* | 1/2016 | Justice | B60H 1/00778 |
| 9,381,856 B1* | 7/2016 | Arnold | B60N 2/002 |
| 9,809,085 B1* | 11/2017 | Pierce | B60H 1/00985 |
| 9,937,830 B1* | 4/2018 | Curry, V | B60N 2/879 |
| 10,627,538 B2* | 4/2020 | Hergott | A47C 1/13 |
| 10,629,056 B1* | 4/2020 | Forest | G08B 21/24 |
| 10,640,009 B2* | 5/2020 | Mizokawa | H01H 13/807 |
| 10,810,853 B2* | 10/2020 | Rogers | G08B 21/0222 |
| 10,946,716 B2* | 3/2021 | Ireri | B60H 1/00778 |
| 2004/0249536 A1* | 12/2004 | Hattori | B60N 2/002 |
| | | | 701/45 |
| 2005/0036380 A1 | 2/2005 | Su | |
| 2005/0040942 A1* | 2/2005 | Johnston | B60H 1/00792 |
| | | | 340/449 |
| 2006/0146629 A1 | 7/2006 | Lee | |
| 2007/0015451 A1* | 1/2007 | McGrath | B60H 1/00742 |
| | | | 340/425.5 |
| 2007/0194735 A1* | 8/2007 | Gao | B60S 1/08 |
| | | | 318/443 |
| 2014/0095017 A1 | 4/2014 | Houle et al. | |
| 2014/0260704 A1* | 9/2014 | Lloyd | B81C 1/0023 |
| | | | 73/865.8 |
| 2015/0306940 A1* | 10/2015 | Salter | B60H 1/00742 |
| | | | 701/49 |
| 2016/0272112 A1* | 9/2016 | DeGrazia | B60Q 9/00 |
| 2017/0190233 A1* | 7/2017 | Wittliff, III | B60H 1/00742 |
| 2017/0259699 A1* | 9/2017 | Lu | G08B 21/24 |
| 2018/0141411 A1 | 5/2018 | Miyakoshi et al. | |
| 2018/0320609 A1 | 11/2018 | McQuillen et al. | |
| 2019/0005412 A1* | 1/2019 | Matus | G06Q 30/0201 |
| 2019/0210423 A1* | 7/2019 | Ghannam | B60H 1/00271 |
| 2019/0215672 A1* | 7/2019 | Orris | B60H 1/00978 |
| 2019/0361625 A1* | 11/2019 | Eliash | G06F 3/0632 |
| 2020/0189348 A1* | 6/2020 | Jackson | B60R 11/04 |
| 2020/0256112 A1* | 8/2020 | Williams | E05F 15/71 |
| 2021/0138873 A1* | 5/2021 | Tsujimura | G05B 23/0232 |

OTHER PUBLICATIONS

Raic, Boris, and Aleksander Radovan. "Microcontroller managed module for automatic ventilation of vehicle interior." 2014 37th International Convention on Information and Communication Technology, Electronics and Microelectronics (MIPRO). IEEE, 2014. (Year: 2014).*

Aiello, Vittoria, et al. "Next-generation technologies for preventing accidental death of children trapped in parked vehicles." Proceedings of the 2014 IEEE 15th International Conference on Information Reuse and Integration (IEEE IRI 2014). IEEE, 2014. (Year: 2014).*

International Search Report and Written Opinion from related international application No. PCT/US2020/058471 dated Feb. 18, 2021, 9 pages.

* cited by examiner

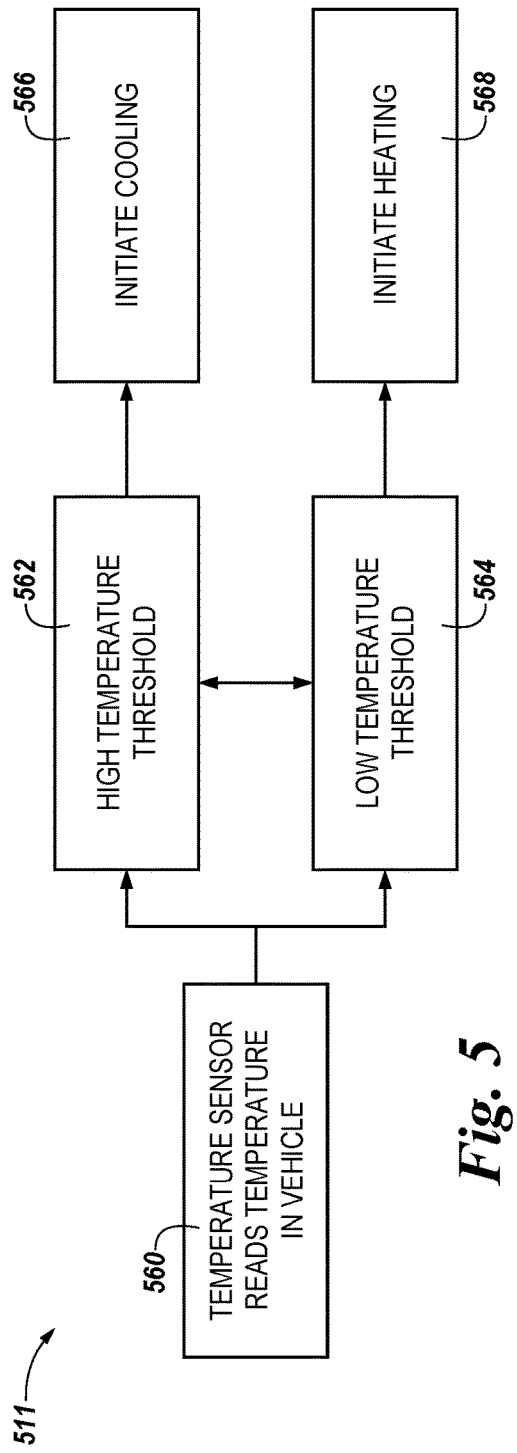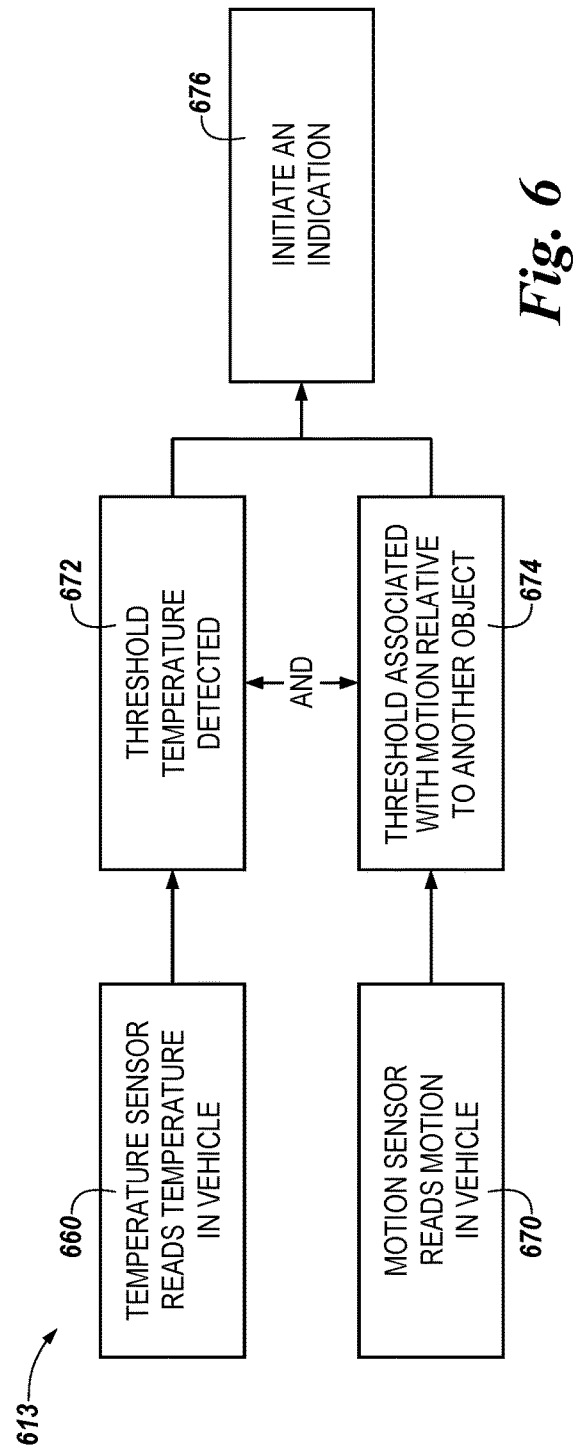

USING MEMORY DEVICE SENSORS

TECHNICAL FIELD

The present disclosure relates generally to semiconductor memory and methods, and more particularly, to apparatuses, systems, and methods for using memory device sensors.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices can be coupled to a another device (e.g., a host device, a computing device, a processing resource, etc.) to store data, commands, and/or instructions for use by the host while the computer or electronic system is operating. For example, data, commands, and/or instructions can be transferred between the other device and the memory device(s) during operation of a computing or other electronic system.

BRIEF DESCRIPTION OF THE DRAWINGS

FIG. 5 is flow diagram including examples of using memory device sensors in accordance with a number of embodiments of the present disclosure.

FIG. 6 is flow diagram including examples of using memory device sensors in accordance with a number of embodiments of the present disclosure.

DETAILED DESCRIPTION

Figure 1:
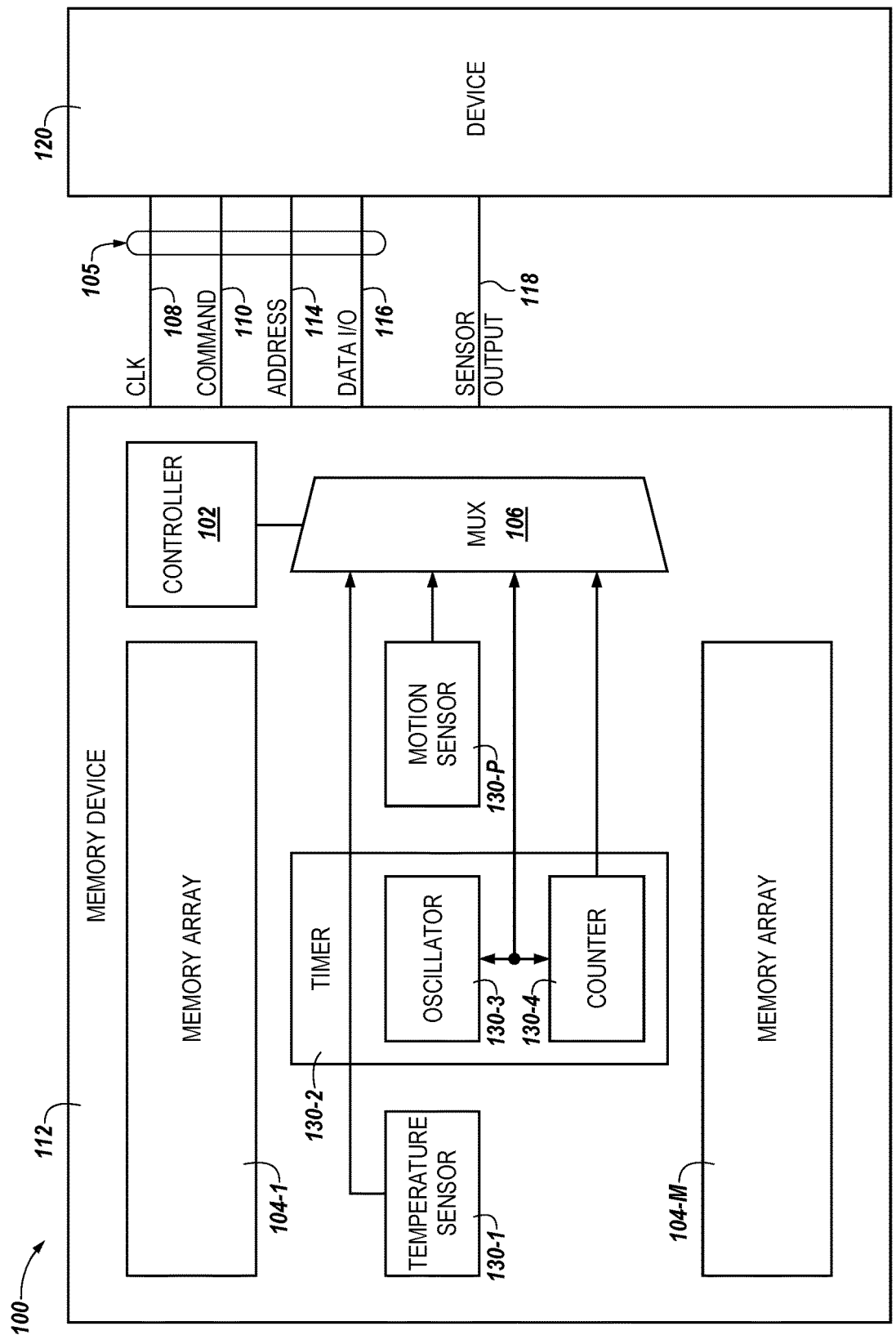
FIG. 1 is a functional block diagram of an apparatus in the form of a computing system including memory device sensors in accordance with a number of embodiments of the present disclosure.

Systems, apparatuses, and methods related to using memory device sensors are described. Some memory system or device types include sensors embedded in their circuitry. For instance, another device can be coupled to a memory device with an embedded sensor. The memory device can transmit the data generated by the embedded sensor using a sensor output coupled to the other device. A controller coupled to a memory device may determine one or more threshold values of a sensor or sensors embedded in a memory device. The memory device may transmit an indication responsive to one or more sensors detecting a value greater or less than a threshold and may transmit the indication to another device.

Memory systems can include multiple types of memory devices including memory media (e.g., volatile and/or non-volatile) and can write data to the various memory devices. Some types of memory devices include embedded sensors in the memory device. In some examples, the sensors are embedded in the memory device and can generate data. The sensor data generated by the sensors can vary based on the type of sensor and the environment of the memory device and/or another device coupled to the memory device. Many devices utilize memory devices and can benefit from sensors embedded in the memory device (e.g., circuitry and/or a substrate of memory devices). Utilizing sensors embedded in memory devices to obtain information generated by the embedded sensor can conserve resources (e.g., space, money, power, etc.) by removing the need to include hardware for an external sensor.

A computing system including memory systems can include one or more different memory device types which can be used to store (e.g., write) data in a computing system. Such data can be transferred between the computing system and the memory system. The data stored in memory devices can be important or even critical to operation of the computing system. Some examples of memory devices include non-volatile memory and volatile memory.

Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data (e.g., error data, etc.) and includes random-access memory (RAM), dynamic random access memory (DRAM), and static random access memory (SRAM), among others. Some types of memory devices can include sensors embedded in the circuitry of the memory device.

For example, DRAM can include one or more sensors (e.g., a temperature sensor) that are embedded in circuitry. The embedded sensors can be programmable to generate a signal. The signal can represent sensor data and the memory device (e.g., including DRAM) can receive the signals and store the data associated with the sensors (e.g., sensor data). The signal can represent data related to an environment where the DRAM is located and/or related to another device that is coupled to the DRAM. Computing devices can frequently include DRAM as memory media. As other devices such as wireless communication devices, processors, central processing units (CPUs), mobile devices, semi-autonomous vehicles, fully autonomous vehicles, Internet of Things (IoT) devices, mobile artificial intelligence systems, wireless communication devices configured to communicate using a wireless peer-to-peer or machine type communication protocols, etc. become more prevalent, sensors and other devices related to computing systems are also increasingly needed to generate information about the surroundings of the device. As such, there is a growing need for information gathered by sensors coupled to devices (e.g., computing devices).

In some approaches, external sensors can be coupled to a computing device and transmit a signal including sensor data to a memory device coupled to the computing system. This approach can provide a signal generated from the sensor to the computing system. This approach can be slow, costly, and the sensors can occupy space that may not be readily available, consume excess power, and/or otherwise waste resources of the computing system (or a host of a computing system).

Hosts can include computing devices, processors, a central processing unit (CPU), and/or be another device connected to the memory device. Such hosts include edge computing devices, computing devices within a mobile device, computing devices within vehicles (e.g., autonomous or semi-autonomous vehicles, etc.) and can use memory devices such as DRAM to execute applications and may benefit from the use of sensors. In some examples herein, memory devices including memory media such as DRAM may include sensors on-board (e.g., embedded in circuitry of the memory device). For example, a vehicle can include a device (e.g., a computing device, a processor, a CPU, etc.) to execute instructions sored in a memory device coupled to the device within the vehicle. The sensors may be intermittently or consistently generating signals including sensor data to be written (e.g., stored) in the DRAM, however, end application access to the sensor data stored in DRAM is not always possible or efficient. As more devices (e.g., edge computing devices, vehicles, etc.) utilize DRAM, and storage capability of memory systems increase, the volume of sensor data generated by embedded sensors increases, and the effects of the inability to access sensor data stored in DRAM become more pronounced. These effects can be further exacerbated by the limitations of some approaches to read and interpret sensor data from external sensors such that the contents can be effective, especially as the amount of sensor data stored in memory systems and the speed at which sensor data retrieval is expected.

In contrast, embodiments herein are directed to enabling end application, user applications, and/or host applications, access to sensors embedded in memory device (e.g., DRAM) such that the device connected to the memory device can conserve resources by refraining from the installation of external sensors thus saving power, unnecessary hardware, cost, etc. Devices can take advantage of already existing embedded sensors included in DRAM that can be included in a memory device coupled to the host. For example, in a context of mobile devices and/or partially or fully autonomous vehicles, decisions related to sensor data received from sensors may require end-user access such that actions can be taken quickly, efficiently, or otherwise interpreted. Enabling the use of sensors already existing on DRAM can increase the availability of such sensor data from sensors.

In another embodiment, sensors described herein can be located and/or exist near and/or on a scribe line in semiconductor memory devices. A scribe line can be located on a semiconductor wafer between dies such that the dies can be separated. In some examples, sensors are integrated on a semiconductor wafer near and/or on the scribe line during manufacturing. Enabling the use of these integrated (e.g., embedded) sensors post-manufacturing can increase the availability of sensor data collected by the sensors without the need of extra and/or external hardware.

Wireless communication devices configured to communicate using a wireless peer-to-peer and/or a machine-type-communication protocol (e.g., vehicles and other IoT devices) may be manufactured to include memory devices such as DRAM. In some examples, memory devices can include sensors in the circuitry of the memory devices. The sensors included in the memory device of vehicles and/or IoT devices can be used to monitor the safety of the vehicle and/or IoT device. Scalability of the sensors embedded in the devices such that the sensor data generated by the embedded sensors are available to end use applications (e.g., to alert, monitor, or vehicle or IoT device safety), users, etc. may be sought in various situations as described herein by examples.

Embodiments herein describe another device coupled to a memory device that can be configured by a controller e.g., a processor, control circuitry, hardware, firmware, and/or software and a number of memory devices each including control circuitry. The controller can include a command decoder to output a value to the other device. As used herein, the term "value" refers to an output from a sensor embedded in the memory device. some examples of values can include a temperature value e.g., a temperature in Fahrenheit, Celsius, Kelvin, or any other unit used to measure thermodynamic temperature. The temperature value can be transmitted as an encoded 8-bit binary string. Another examples of a value can be a unit of time (e.g., microseconds (μs), seconds, minutes, etc.), or a quantity of detection events. A detection event can be a quantity of motion events detected by a motion sensor embedded in memory devices and a motion value and/or a motion sensor value can be a quantity of motion events detected.

The output from the embedded sensors can be transmitted from the memory device using a sensor output. As used herein, the term "sensor output" refers to an output component that is configured to transfer sensor data from an embedded sensor to a device. For example, a sensor output can be separate from a data output generally included on a bus. The sensor output can be used to transmit an indication about the sensor data to a device. The sensor output can be dedicated to the sensor such that it is configured to transmit a signal representing sensor data and/or an indication to the device.

In some examples, a sensor output described herein can be a value generated as an average of more than one embedded sensor. In some examples, the sensor output can be a weighted average of more than one embedded sensor where the weight is based on the location of the embedded sensor relative to the area where the sensor is generating sensor data. For example, more than one embedded temperature sensor can be located in various positions on a device (e.g., an IoT device, a vehicle, etc.) to monitor the temperature of the interior device. For example, the temperature sensor value generated by an embedded sensor located nearest to the interior sensor in a vehicle can be weighted higher than a different embedded sensor generating temperature data from farther away from the interior of the vehicle.

In another embodiment described herein, memory devices such as DRAM having an embedded sensor can be configured to transmit a signal representing sensor data from the embedded sensor to a device coupled to the memory device using standard I/O lines included in a bus. For example, a controller (e.g., a command decoder) can receive a command (e.g., a multi-purpose register read command), and the memory devices can be configured to map each embedded sensor output to a corresponding multi-purpose register. In this example, existing bandwidth of the memory device can be used to conserve the need for a dedicated sensor output.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," "M", "P", etc., particularly with respect to reference numerals in the drawings, indicate that a number of the particular feature so designated can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context, and, unless stated otherwise, can include a wireless connection. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 106 can reference element "06" in FIG. 1, and a similar element can be referenced as 206 in FIG. 2. A group or plurality of similar elements or components can generally be referred to herein with a single element number. For example, a plurality of reference elements 230-1, . . . , 230-P (e.g., 230-1 to 230-P) can be referred to generally as 230. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram of an apparatus in the form of a computing system 100 including memory device sensors in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The computing system 100 can include memory device 112. The memory device 112 can include memory array 104-1 and memory array 104-M which may be collectively referred to herein as the memory array 104. The memory device 112 can include a controller 102 coupled to a multiplexer (MUX) 106. The MUX 106 can be coupled to one or more sensors embedded in circuitry of the memory device 112. For example, the MUX 106 can be coupled to a temperature sensor 130-1, a timer 130-2 (e.g., for self-refresh control), an oscillator 130-3, a counter 130-4, and/or a motion sensor 130-P, which may be collectively referred to as the sensor or the sensors 130. A motion sensor can include integrated orientation sensors such as accelerometers and/or gyroscopes (e.g., microelectromechanical system gyroscope). Although specific types of sensors are mentioned herein, embodiments are not so limited and other sensors can be used (e.g., a pressure sensor and/or a random number generator).

The memory device 112 can include volatile or non-volatile memory. For example, the memory media of the memory device 112 can be volatile memory media such as DRAM. DRAM can include a plurality of sensors which can be at least one of a temperature sensor, a motion sensor, an oscillator, a timer, or a combination thereof. The memory device 112 can be coupled to another device 120 via a bus 105. The bus 105 can include a clock line (CLK) 108, a command line 110 to transmit commands, an address line 114 to determine where commands should be sent, and a data input/output (data I/O) 116. The other device 120 can be a central processing unit (CPU), a graphics processing unit (GPU), an application specific integrated circuit (ASIC), an edge computing device, etc. The other device 120 can be a host and/or included as part of another device such as a vehicle (not illustrated as to not obscure examples of the disclosure).

A host (e.g., a processor, a CPU, a computing system, etc.) can be a host system such as a processor within a wireless communication device, a processor within a personal laptop computer, a processor within a vehicle, a processor within a desktop computer, a processor within a digital camera, a processor within a mobile telephone, a processor within an IoT enabled device, or a processor within a memory card reader, a processor within graphics processing unit (e.g., a video card), among various other types of host systems. As used herein an "IoT enabled device" can refer to devices embedded with electronics, software, sensors, actuators, and/or network connectivity which enable such devices to connect to a network and/or exchange data. Examples of IoT enabled devices include wireless communication devices, mobile phones, smart phones, tablets, phablets, computing devices, implantable devices, vehicles, home appliances, smart home devices, monitoring devices, wearable devices, devices enabling intelligent shopping systems, among other cyber-physical systems.

The other device 120 can include a system motherboard and/or backplane and can include a number of memory access devices, e.g., a number of processing resources (e.g., one or more processors, microprocessors, or some other type of controlling circuitry). One of ordinary skill in the art will appreciate that "a processor" can intend one or more processors, such as a parallel processing system, a number of coprocessors, etc. The other device 120 can be coupled to memory device 112 by the bus 105.

The controller 102 can include a command decoder which can receive commands from the command line 110 of the bus 105. The command to read data from a sensor 130 can be received by the controller 102. The command can be a mode register type command from the other device 120 which can include information related to which sensor needs to output sensor data using the sensor output 118. The MUX can be a device that selects between analog and digital input signals received from selection pins and forward the signal to the sensor output 118.

As mentioned, the computing system 100 includes a sensor 130 embedded in circuitry the memory device 112. The sensor 130 can be configured to collect data related to the device 120. For example, the device 120 can be a part of and/or coupled to another device such as a vehicle. The sensor 130 can be embedded in the memory device 112 such as including memory such as DRAM and collect data corresponding to an environment of the device 120. Said differently, the embedded sensor 130 can be a temperature sensor 130-1 which can generate a sensor data value (e.g., a particular temperature value) in the form of a temperature of the memory device 112 coupled to another device such as a vehicle.

The memory device 112 can be configured to transmit the sensor 130 data to the device 120 using the sensor output 118. For example, the sensor output 118 coupled can be coupled to one or more of the sensors 130 and to the other device 120 to transmit the sensor data collected by the sensor 130 to the other device 120. The sensor output can be dedicated to the sensor embedded in the memory device 112. In this way, embedded sensors 130 can be accessible by end applications to provide sensor generated sensor data.

In some embodiments, the MUX 106 can receive sensor data from multiple sensors 130 responsive to receiving a command from the controller 106. For example, the controller 106 can receive a request from the other device 120 via the bus 105 to read sensor data from one or more sensors 130. Responsive to receiving the request, the controller 102 can transmit a command to the MUX 106 to select and forward sensor data from the temperature sensor 130-1 and the motion sensor 130-P, where the motion sensor 130-P and the temperature sensor 130-1 are both embedded in circuitry of the of the memory device 112. The MUX 106 can transmit the sensor data form the temperature sensor 130-1 and the motion sensor 130-P to the other device 120 via the sensor output 118.

Figure 2:
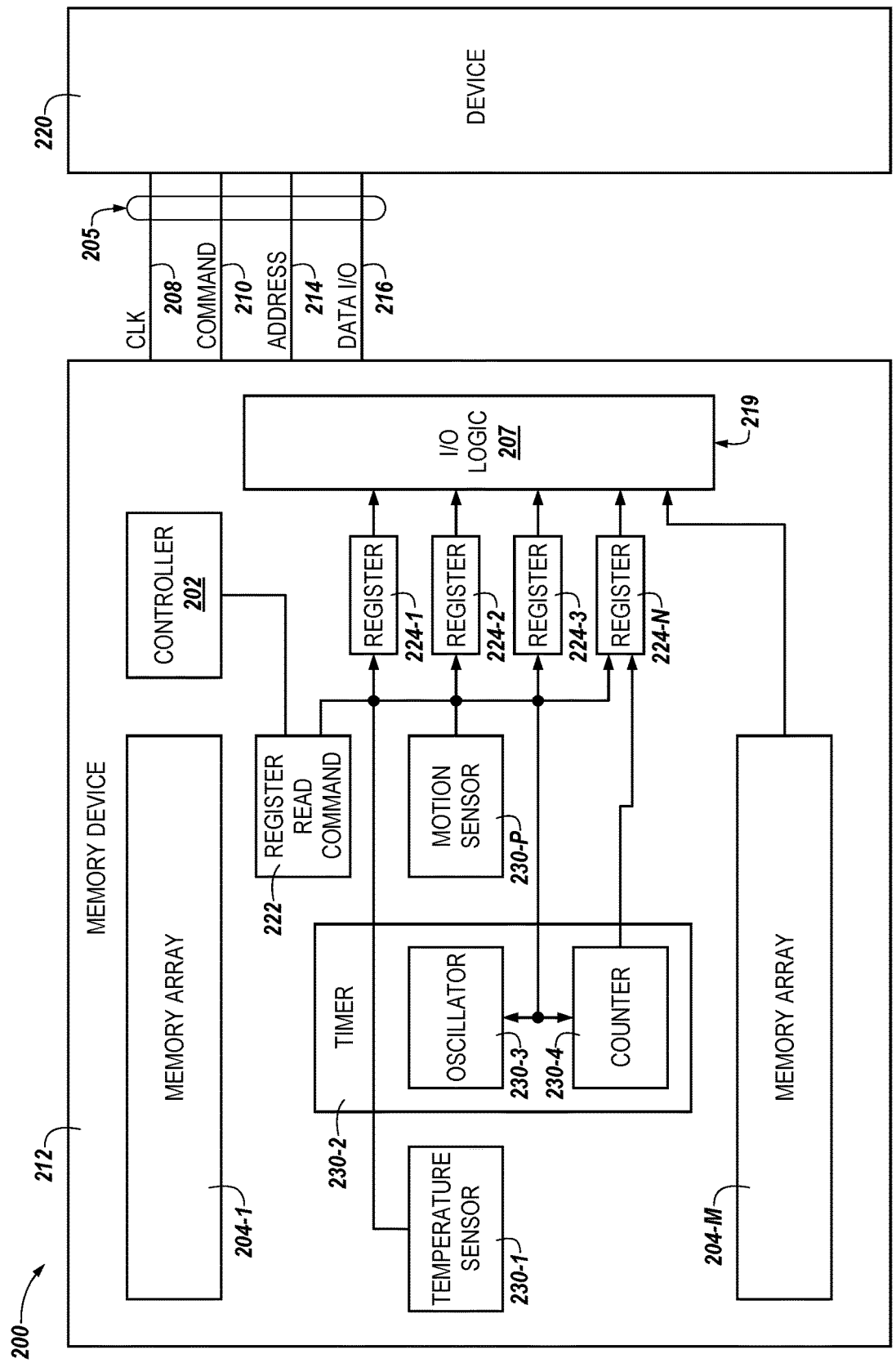
FIG. 2 is a functional block diagram in the form of a computing system including device sensors in accordance with a number of embodiments of the present disclosure.

FIG. 2 is a functional block diagram in the form of a computing system 200 including memory device sensors 230 in accordance with a number of embodiments of the present disclosure. The computing system 200 can include memory device 212 and be analogous to the memory device 112 of FIG. 1. The memory device 212 can include memory array 204-1 and memory array 204-M which may be collectively referred to herein as the memory array 204 and be analogous to the memory array 104 of FIG. 1.

The memory device 212 can include controller 202 which can be analogous to controller 102 of FIG. 1. The controller 202 can be coupled to registers 224-1, 224-2, 224-3, and 224-N and be collectively referred to herein as registers 224. The registers 224 can each be coupled to one or more sensors embedded in circuitry of the memory device 212. For example, the register 224-1 can be coupled to a temperature sensor 230-1, the register 224-2 can be coupled to a motion sensor 230-P, the register 224-3 and 224-N can be coupled to a timer 230-2 via an oscillator 230-3 and/or a counter 230-4, which may be collectively referred to as the sensor or the sensors 230. Although specific types of sensors are mentioned herein, embodiments are not so limited and other sensors can be used (e.g., a pressure sensor and/or a random number generator).

The memory device 212 can be coupled to another device 220 via a bus 205. The bus 205 can include a clock line (CLK) 208, a command line 210 to transmit commands, an address line 214 to determine where commands should be sent, and a data input/output (data I/O) 216. The other device 220 can be a central processing unit (CPU), a graphics processing unit (GPU), an application specific integrated circuit (ASIC), an edge computing device, etc. The other device 220 can be included as part of another device such as a vehicle (not illustrated as to not obscure examples of the disclosure).

The bus 205 can be coupled to an input/output logic (IO logic) 219. The IO logic 219 can be a communication between the memory device 212 and the other device 220. The I/O logic 219 can include hardware to perform input and output operations for the memory device 212. The I/O logic 219 can receive information from the imbedded sensors 230 and transmit them to the other device 220 via the bus 205.

FIG. 2 illustrates an example of another device 220 and memory device 212 coupled to the other device 220. The memory device 212 includes a plurality of sensors 230 embedded in the memory device 212, and a plurality of registers 224 each respectively coupled to one of the plurality of sensors 230, the controller 202 (e.g., a command decode) to transmit commands to read one or more of the plurality of registers, and a data output (Data/IO) 216 coupled to the plurality of registers 224 (e.g., via the IO logic 219) to transmit the sensor data from the plurality of registers 224 to the other device 220.

The signal representing sensor data transmitted from the sensors 230 to respective registers 224 can be data of an operation of the sensor 230. For example, the temperature sensor 230-1 can generate a temperature value and transmit the temperature value to the register 224-1, the embedded timer 230-2 can include an oscillator 230-3 and/or a counter 230-4 which can transmit a signal representing sensor data to register 224-3 and/or 224-N, the embedded motion sensor 230-P can transmit motion sensor data to the register 224-2.

The embedded timer can include the oscillator 230-3 which can produce a periodic signal to transmit to the register 224-3 and/or to the counter 230-4. The counter 230-4 can (independently or concurrently with the oscillator 230-3) transmit a quantity of incidences of sensor data collected by one or more of the sensors 230. Said differently, the oscillator 230-3 can work with the counter 230-4 to periodically generate a signal which can report a quantity of sensor data signals generated from any of the sensors 230. In contrast, the oscillator 230-3 and the counter 230-4 can operate independently to transmit respective sensor data to respective registers.

In some embodiments, the controller 202 can configure the sensors 230 to generate sensor data based on parameters. For example, the controller 202 can configure the sensors 230 to generate sensor data to the respective registers 224 when the other device 220 is located in a particular environment. The controller 202 can generate a register read command 222 to read the sensor data stored in the respective registers and the I/O logic 219 can transmit a signal representing sensor data from the registers 224 to the other device 220.

The environment can be a location of the other device 220 (e.g., a location of the other device). The controller 202 can receive an indication from the other device 220 related to the environment, and the controller 202 can configure the sensors 230 to generate sensor data about the environment. For example, the controller 202 can receive an indication that the other device 220 is located in an environment. The controller 202 can configure the temperature sensor 230-1 to generate a temperature value (e.g., an encoded 8-bit binary string) and transmit the temperature value to the register 224-1. Responsive to a register read command 222 transmitted from the controller 202, the I/O logic 219 can transmit the sensor data from the register 224-1 including the temperature value to the other device 220. Said differently, the I/O logic 219 can transmit the values related to the respective operations of the plurality of sensors 230 to the other device 220. Using these methods, the temperature value generated by the embedded temperature sensor 230-1 can be accessible to the other device 220 and/or user.

In some embodiments, the embedded timer 230-2 (using an embedded oscillator 203-3 and/or an embedded counter 230-4) can produce a timer output with a fixed period such as In other embodiments, the timer output can be a flag, where the controller 202 is configured to generate a register read command 222 when a quantity of seconds have elapsed. The controller 202 can program the memory device 212 to generate sensor outputs to the respective registers 224 based on the quantity of seconds that have elapsed.

As mentioned, the motion sensor 230-P can be embedded in the circuitry of the memory device 212 and can detect a change in motion within an environment. For example, the environment can be a location of the other device 220. The controller 202 can receive an indication from the other device 220 related to the environment and the controller 202 can configure the sensors 230 to generate sensor data about the environment. For example, the controller 202 can receive an indication that the other device 220 is located in an environment. The controller 202 can configure the motion sensor 230-P to generate a flag if motion is detected in the environment. Responsive to a register read command 222 transmitted from the controller 202, the I/O logic 219 can transmit the sensor data from the register 224-2 including the motion sensor flag to the other device 220.

In some embodiments, multiple embedded sensors 230 can be used in combination to provide information to the user via the other device 220. For example, the other device 220 can be coupled to a wireless communication device which can initiate an operation responsive to transmission of the signal representing sensor data (e.g., from one or more of the sensors 230) from the plurality of registers 224 to the other device 220. The wireless communication device can include the other device 220 and can make decisions based on the received sensor data. For example, the wireless communication device may be a mobile phone, and the other device 220 coupled to the mobile phone may receive a temperature value from the temperature sensor 230-1, and the motion sensor 230-P embedded in the memory device 212 of the mobile phone. Based on the receipt of the temperature value and the motion sensor value, the other device 220 may initiate the mobile phone to change an operation (e.g., switch from on to off). Using these methods, users can gain access to embedded sensor data and avoid the need for external sensor installations.

Figure 3:
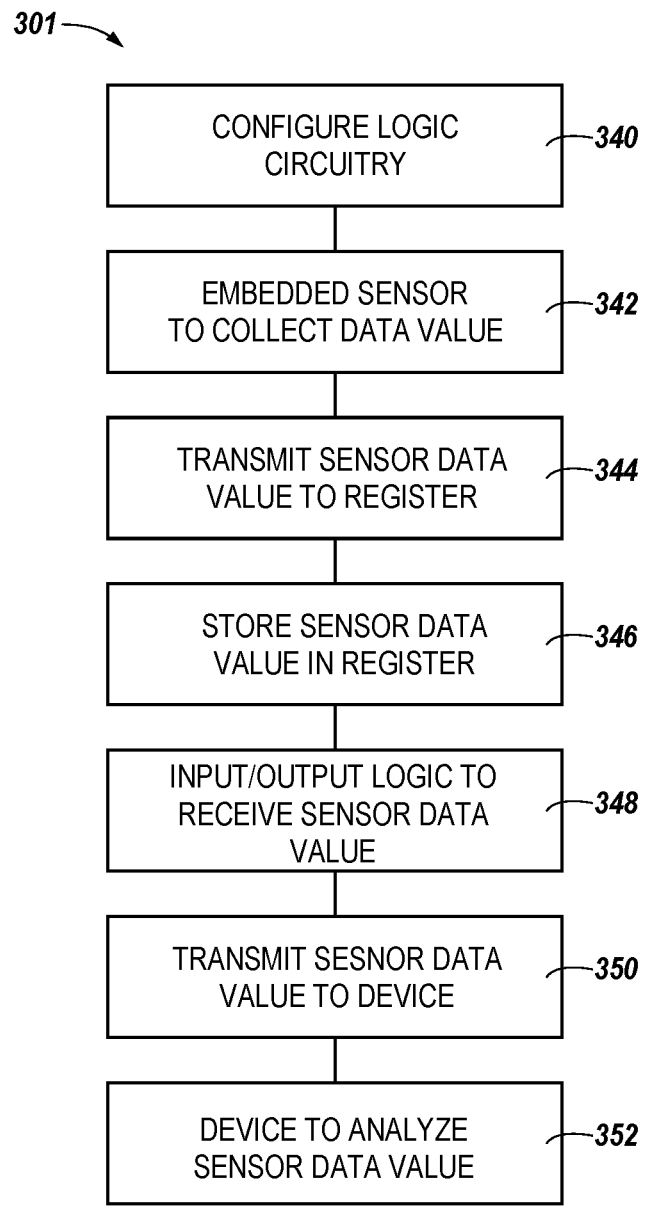
FIG. 3 is flow diagram including examples of memory device sensors in accordance with a number of embodiments of the present disclosure.

FIG. 3 is flow diagram including an example of memory device sensors in accordance with a number of embodiments of the present disclosure. The flow diagram 301 of FIG. 3 describes a memory device (e.g., the memory device 112 of FIG. 1) programming, via a controller (e.g., the controller 102 of FIG. 1), sensors (e.g., the sensors 130 of FIG. 1) embedded in circuitry of the memory device, to generate sensor data related to the memory device coupled to another device (e.g., the device 120 of FIG. 1). At block 340 the memory device can configure, via the controller, the sensors embedded in the circuitry of the memory device to generate sensor data to be externally accessible to another device. For example, the memory device can be configured to generate sensor data from the embedded sensors. In some embodiments, the memory device can be configured to generate the sensor data from the embedded sensors at predetermined intervals, when the other device is operating, and/or when the sensors detect a value that is greater than or less than a predetermined threshold.

At block 342, one or more of the embedded sensors can collect sensor data values. For example, a temperature sensor (e.g., the temperature sensor 130-1 of FIG. 1) can collect a temperature from an environment of which the other device and/or the memory device is located. The sensors embedded in the circuitry of the memory device may collect sensor data intermittently, responsive to a command, and/or continuously, etc. In some embodiments, the sensor data collected by the sensors can be transmitted to the other device via a dedicated output (e.g., the sensor output 118 of FIG. 1). The sensor output can be coupled to the sensors embedded in the memory device. In other embodiments, the sensor data can be transmitted to a register (e.g., the registers 224 of FIG. 2) that is mapped to each embedded sensor.

For example, at block 344, the memory device can transmit the sensor data value to a corresponding register. At block 346 the sensor data value from the embedded sensor can be stored in its corresponding register until it is transmitted to the other device. In some examples, the register can store the sensor data value until it is retrieved by an I/O logic (e.g., the I/O logic 207 of FIG. 2). At block 348, the I/O logic can receive the sensor data value from the register. The I/O logic can receive the sensor data value responsive to a register read command (e.g., the register read command 222 of FIG. 2) generated by the controller of the memory device. The register read command can be generated responsive to the other device being in an environment, changing an environment, and/or requested by a user.

At block 350 the sensor data value can be transmitted to the other device. As mentioned herein, the other device can be coupled to or be a part a device such as a vehicle, etc. Using an embedded sensor, a user of the vehicle can benefit from embedded sensors being accessible. The vehicle can save resources, time, and/or power by utilizing sensors that are embedded in the memory device of the vehicle. The sensor data collected from the sensors embedded in the memory device can be analyzed by the other device. At block 352, the other device can analyze the sensor data value received from the embedded sensors. In some examples, the other device can cause the vehicle coupled to the other device to change an operation based at least in part on the sensor data received from the memory device.

Figure 4:
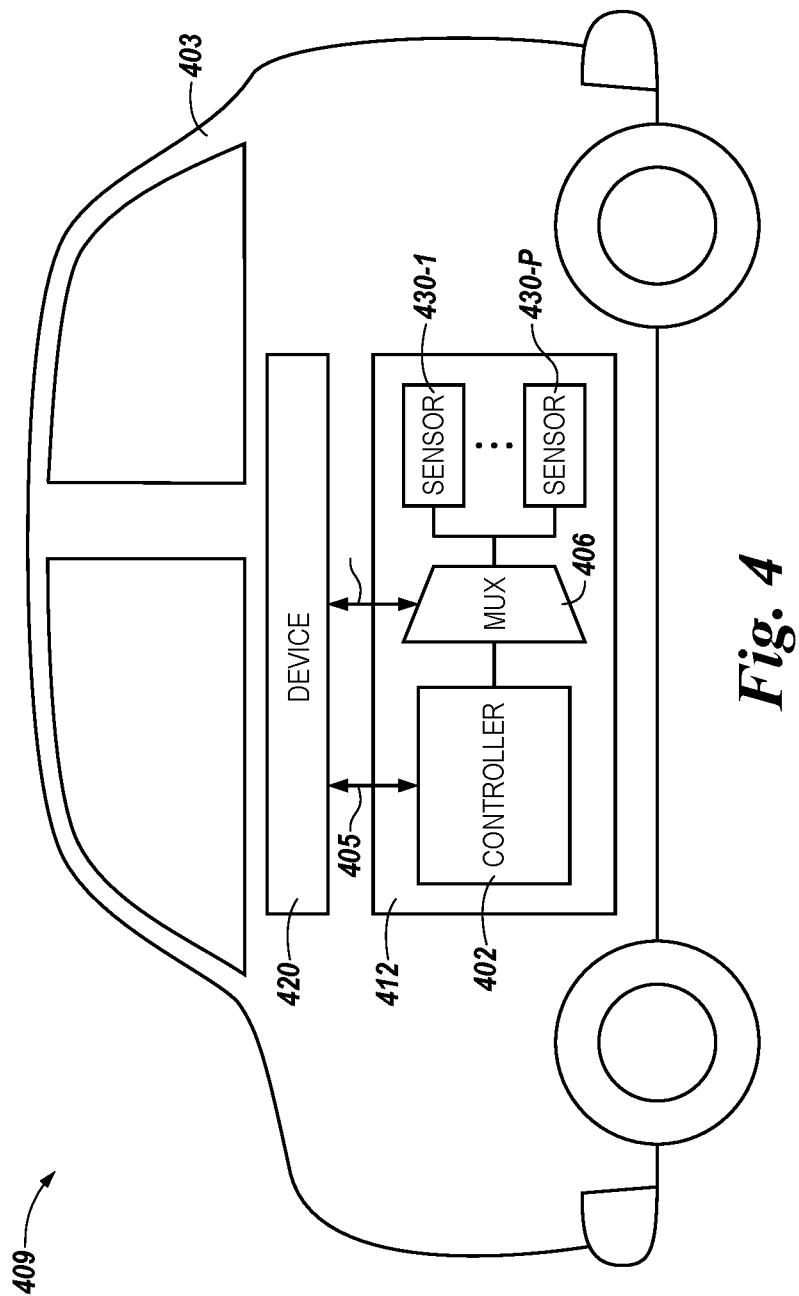
FIG. 4 is diagram including examples of a system including memory device sensors coupled to another device of a vehicle in accordance with a number of embodiments of the present disclosure.

FIG. 4 is diagram including examples of a system 409 including memory device sensors 430 coupled to another device 420 of a vehicle 403 in accordance with a number of embodiments of the present disclosure. A vehicle may include a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, and/or anything used for transporting people and/or goods. The other device 420 can be a host controller and/or a separate device including a host controller and/or connected to a host controller.

A host controller can be a controller designed to assist in processing (e.g., operations, automation, decision control, etc.) endeavors of a device (e.g., the vehicle 403) coupled to the host controller. For example, the other device 420 can be a wireless communication device and/or an advanced driver assistance system controller (ADAS). An ADAS can monitor sensor data from the sensors embedded in the memory device 412 to prevent accidents and provide warning of potentially unsafe situations. For example, the ADAS may monitor sensors in a vehicle 403 and take control of the vehicle 403 operations (e.g., heating and cooling) to avoid accident or injury. A host controller such as an ADAS may need to act and make decisions quickly to avoid accidents and/or injury. The memory device 412 can be coupled to the other device 420 via a bus 405 which can be analogous to the bus 105 described in connection with FIG. 1.

The memory device 412 includes sensors 430-1 and 430-P which can be collectively referred to as the sensors 430 and analogous to the sensors 130 of FIG. 1. The memory device can include a MUX 406 that can be coupled to the sensors 430 embedded in circuitry of the memory device 412. The MUX 406 can transmit the sensor data from the sensors 430 to the other device 420 via the sensor output 418. The memory device 412 can further include a controller 402 to configure the sensors 430, the controller 402 can be analogous to the controller 102 of FIG. 1.

The sensors 430 can monitor the vehicle 403. Different sensors can monitor the vehicle 403 to generate different values. The sensors 430 can include an embedded temperature sensor, an embedded motion sensor, an embedded timer, an embedded oscillator, an embedded clock, etc. The sensor output 418 can be dedicated to the sensors 430 embedded in the memory device 412. In this way, the other device 420 of the vehicle 403 can access sensor data generated from the embedded sensors 430 thus avoiding the need for external sensors to monitor aspects of the vehicle 403.

In some example, the other device 420 can be a wireless communication device with a user accessible interface. A device including a user accessible interface can be a device that can communicate indications generated by the memory device 412 about the environment of the vehicle 403. The user accessible interface may be a device with wireless capability to alert a user of the vehicle 403 about values generated by the embedded sensors 430. The sensors 430 can be configurable to include thresholds, and when the values generated are greater than or less than the respective configured threshold, the memory device 412 can transmit an indication to the other device 420 via the sensor output 418.

For example, a temperature sensor 430-1 can be configured to have a first threshold (e.g., a low threshold) temperature of 5 degrees Celsius and a second threshold (e.g., a high temperature) threshold of 25 degrees Celsius. A value generated by the temperature sensor 430-1 that is above or below the respective thresholds would be any temperature below 5 degrees Celsius or above 25 degrees Celsius. Another sensor 430-P can be a motion sensor embedded in the memory device 412. The motion sensor 430-P can include a threshold quantity of motion values detected within a predetermined period of time. For example, the motion sensor 430-P embedded in the memory device and configured with a threshold quantity of 0-2 motion values detected within a 60 second period inside the vehicle 403. A quantity greater than 2 motion values detected by the motion sensor 430-P is greater than the configured threshold. Although specific values are mentioned herein by example, any threshold value can be configured as thresholds for the sensors 430 embedded in the memory device 412.

The example embodiment illustrated by FIG. 4 illustrates a system 409 including a vehicle 403 with another device 420 (e.g., a host controller, a wireless communication device, etc.) coupled to the memory device 412 including one or more sensors 430 embedded in the memory device 412 and coupled to the other device 420 via the sensor output 418. The memory device 412 and/or the controller 402 can be configured to determined respective thresholds for each of the one or more sensors 430 embedded in the memory device 412 and transmit an indication to the other device 420 responsive to the one or more sensors detecting a value that is greater than or less than the respective thresholds for the one or more sensors 430.

For example, the sensor 430-1 can be a temperature sensor embedded in the memory device 412 and configured with a temperature threshold. The temperature threshold can include a high temperature threshold and/or a low temperature threshold. The sensor 430-P can be a motion sensor embedded in the memory device 412 and configured with a threshold associated with a characteristic of relative motion of another object. As described herein, a threshold associated with a characteristic of relative motion of another object can be a quantity of detected motion values detected within a period of time, where the period of time can be sensed by a timer sensor (e.g., the timer 130-2 of FIG. 1).

The controller 402 can configure the sensors 430 with the respective thresholds and can transmit an indication to the other device 420 via the sensor output 418 that the values generated by the sensors are greater than or less than the respective thresholds. For example, the controller 420 can be configured to transmit the indication to the other device 420 via the sensor output 418 responsive to a determination that a temperature value detected by the temperature sensor 430-1 is greater than or less than the respective temperature threshold and responsive to a determination that a motion value detected by the motion sensor 430-P is greater than the threshold associated with a characteristic of relative motion of another object. Using these methods, the other device 420 can take an action e.g., initiate a heating or cooling element responsive to the receipt of the indication.

In another embodiment, the memory device 412 can be configured to refrain from transmitting an indication responsive to the values generated by the sensors 430 being within the configured thresholds. For example, the controller 402 can be configured to refrain from transmitting an indication to the other device 420 via the sensor output 418 responsive to a determination that a temperature value detected by the temperature sensor 430-1 is inside the temperature threshold and responsive to a determination that a motion value detected by the motion sensor 430-P is within the threshold associated with a characteristic of relative motion of another object.

The embedded sensors 430 and/or the memory device 412 (e.g., the controller 402 within the memory device 412) can be configured to refrain from generating an indication based on an operation of the vehicle 403. In the context of safety of an animal, human, organism, or otherwise vulnerable items being in an interior of a vehicle with potentially detrimental temperatures, the operation of the vehicle 403 can indicate the safety concern. For example, if the vehicle 403 is moving, the movement of the vehicle can be indicated by the other device 420 that is in communication with the memory device 412 having embedded sensors 430. The vehicle 403, when moving, may not require an indication of motion detected within the interior of the vehicle. As such, the controller 402 of the memory device 412 can configure the embedded sensors 430 to refrain from generating sensor data and/or the embedded sensors 430 can be configured to be disabled during certain operations of the vehicle.

For example, the controller 402 can detect a change in an operation of the other device 420, where the other device 420 is coupled to a vehicle 403 and the change in operation is the vehicle 403 changing from a parked operation to a moving operation. The controller 402 can alter a temperature threshold of the temperature sensor 430-1 embedded in the memory device 412 and alter a threshold associated with a characteristic of relative motion of another object of the motion sensor 430-P embedded in the memory device 412 where the temperature threshold and the threshold associated with a characteristic of relative motion of another object are altered based at least in part on the detected change in operation of the vehicle 403. The alteration by the controller 402 can include increasing or decreasing the temperature threshold, increasing or decreasing the threshold associated with a characteristic of relative motion of another object e.g., the quantity of motion values detected within a time period, and/or disabling an embedded sensor from operating. For example, the controller 402 can disable the motion sensor 430-P embedded in the memory device 412 based on the detection by the controller 412 that the vehicle 403 is in motion.

While the examples of FIG. 4 describe the utilization of a sensor output 418, embodiments are not so limited. The examples, described in connection with FIG. 4 can utilize registers (e.g., the registers 224 of FIG. 2) and an I/O logic (e.g., the I/O logic 207 of FIG. 2).

FIG. 5 is flow diagram 511 including examples of using memory device sensors in accordance with a number of embodiments of the present disclosure. The flow diagram 511 describes a vehicle (e.g., the vehicle 403 of FIG. 4) having sensors (e.g., sensors 430 of FIG. 4) embedded in memory device (e.g., memory device 112 of FIG. 1) coupled to another device (e.g., the device 420 of FIG. 4) such that the values generated by the sensors can be provided to the device via a sensor output (e.g., the sensor output 418). In some embodiments, the device is included in the vehicle and the sensor is a temperature sensor embedded in the memory device coupled to the vehicle, to generate a temperature value of the interior of the vehicle.

For example, at block 560 the flow chart 511 describes a temperature sensor (e.g., the temperature sensor 130-1 of FIG. 1) to read a temperature of the vehicle. The temperature read by the temperature sensor can be an interior temperature of the vehicle. The temperature sensor is embedded in memory device coupled to the vehicle, and the controller of the memory device can configure the temperature sensor to have a high temperature threshold and a low temperature threshold.

For example, the vehicle can include safety features that enable the memory device to generate an indication (e.g., an alert) responsive to the determination that a temperature has increased or decreased to a value determined to be unsafe. For example, the at block 562, the flow diagram 511 includes the controller configuring the temperature sensor embedded in the memory device to include a high temperature threshold of the interior of the vehicle. At block 564, the flow diagram 511 includes the controller configuring the temperature sensor embedded in the memory device to include a low temperature threshold of the interior of the vehicle. The temperature sensor can generate a temperature value of the interior of the vehicle, and when the generated value is within the threshold (e.g., in-between the low temperature threshold and the high temperature threshold) the controller coupled to the memory device can transmit an indication via the sensor output that the temperature is within the threshold.

For example, the other device (e.g., a computing device, a host controller, a wireless communication device, etc. coupled to the vehicle) can receive a temperature value via the sensor output, where the temperature value is generated by the sensor embedded in the memory device. The other device coupled to the vehicle can determined that the temperature value is in-between (e.g., in-between the low temperature threshold and the high temperature threshold) and refrain from activating a temperature control component (of the vehicle) based on the temperature value. The vehicle (e.g., a device connected to the vehicle, a user, or an end application) having access to an embedded sensor within the memory device can be used in this way to conserve resources and provide configurable safety features.

When the temperature is within the threshold (e.g., between the high temperature threshold and the low temperature threshold), the vehicle and/or a user of the vehicle can be aware because the sensor output provides access to the temperature sensor data generated by the embedded sensor. However, the high and low threshold may be configured to keep contents of the vehicle safe. In some examples, an animal, a human, medication, sensitive computing devices, etc. can be left in a vehicle. Thus, the other device (e.g., the host controller) of the vehicle can access the embedded temperature sensor and configure the vehicle to initiate operations based on the output of the temperature sensor.

In an embodiment, an indication may be an alert that is transmitted to the other device of the vehicle responsive to the temperature sensor generating a value that is above the high temperature threshold discussed at block 562. At block 566, the flow diagram 511 includes the vehicle to initiate cooling of the interior of the vehicle. For example, responsive to receiving the indication via the sensor output, the other device (included in the vehicle) activates a cooling component. Using this method, the embedded sensor can provide sensor data that is accessible to users and end use applications.

In another embodiment, another indication may be another alert that is transmitted to the other device of the vehicle responsive to the temperature sensor generating a value that is below the low temperature threshold discussed at block 564. At block 568, the flow diagram 511 includes the vehicle to initiate heating of the interior of the vehicle. For example, responsive to receiving the indication via the sensor output, the other device (included in the vehicle) activates a heating component. Using this method, the embedded sensor can provide sensor data that is accessible to users and end use applications.

In some examples, the other device of the vehicle can be a user interface and/or remotely coupled (e.g., wirelessly) to a user interface such that a user or end application can be made aware of the temperature value (e.g., 25 degrees Celsius) of the interior of the vehicle. As such the controller of the memory device can transmit, via the sensor output, the temperature value to a user interface coupled (wirelessly or directly) to the vehicle.

While the examples of FIG. 5 describe the utilization of a sensor output, embodiments are not so limited. The examples, described in connection with FIG. 5 can utilize registers (e.g., the registers 224 of FIG. 2) and an I/O logic (e.g., the I/O logic 207 of FIG. 2).

FIG. 6 is flow diagram 613 including examples of using memory device sensors in accordance with a number of embodiments of the present disclosure. The flow diagram 613 describes a vehicle (e.g., the vehicle 403 of FIG. 4) having sensors (e.g., sensors 430 of FIG. 4) embedded in memory device (e.g., memory device 112 of FIG. 1) including a controller (e.g., the controller 102 of FIG. 1) coupled to another device (e.g., the device 420 of FIG. 4) such that the values generated by the sensors can be provided to the other device via a sensor output (e.g., the sensor output 418).

The memory device can include a first sensor and a second sensor embedded in the circuitry of the memory device. For example, the other device can be coupled to the vehicle and the first sensor can be a temperature sensor embedded in the memory device to determine a temperature value of an interior of the vehicle; and the second sensor can be a motion sensor embedded the memory device to detect motion within the interior of the vehicle where the temperature value and the motion value can be transmitted to the other device via the sensor output.

The temperature sensor and the motion sensor can be configured by the controller coupled to memory device to provide sensor data (e.g., sensor values) to the other device coupled to the vehicle. The temperature sensor and the motion sensor can be configured to transmit a signal representing sensor data individually or configured by the controller to provide the sensor data to the other device simultaneously. The temperature sensor can be configured with a threshold temperature (e.g., a high temperature threshold and/or a low temperature threshold). The motion sensor can be configured by the controller to include a threshold associated with a characteristic of relative motion of another object. In some examples, the threshold associated with a characteristic of relative motion of another object can be a quantity of motion values detected by the motion sensor embedded in the memory device within a predetermined period of time. In this example, the period of time can be monitored (e.g., determined) by a timer embedded in the memory device (e.g., the timer 130-2 of FIG. 1).

Embedded sensors in memory device can be configured with respective thresholds to provide safety features for a vehicle and/or a user of a vehicle, etc. For example, a temperature sensor can monitor the temperature in the interior of a vehicle and transmit an indication to another device coupled to the vehicle, responsive to the interior vehicle temperature being greater than or less than a respective configured temperature threshold. In some examples, the interior temperature of the vehicle may be a safety hazard if an animal, human, or otherwise vulnerable organism and/or item is inside the vehicle. To avoid this safety hazard, a temperature sensor can be configured to be used with a motion sensor such that an indication (e.g., an alarm) is transmitted to the vehicle (e.g., a host controller or another device) in the event that an interior temperature of the vehicle is detected that is greater than or less than a respective threshold and a motion value is detected by a motion sensor that is greater than or less than a respective configured threshold motion.

Configuring sensors embedded in memory device to provide sensor data generated by the respective embedded sensors to another device coupled to a vehicle can provide safety features otherwise unavailable without enduring the burden of additional installation or coupling of sensors. The embedded sensors can be configured with thresholds and the memory device can be configured to transmit an indication that the conditions inside a vehicle are greater than or less than a respective configured thresholds and/or when conditions of the vehicle are met. For example, the interior temperature of a vehicle can be a safety concern when the vehicle is not operated (e.g., parked, off, unattended by an operator, etc.) and an animal, human, or otherwise vulnerable organism and/or item is inside the vehicle. Sensors embedded in the memory device (e.g., DRAM) of the vehicle can be configured to generate sensor data of the interior of the vehicle and alert a user when a perceived dangerous temperature has been reached and movement has been detected in the vehicle.

In an example embodiment, an embedded temperature sensor and an embedded motion sensor can be configured initiate an alert (e.g., an indication) when both exceed a respective threshold and to refrain from generating an alert responsive to the determination that only one of the sensors has detected conditions greater than or less than the respective thresholds. For example, an embedded temperature sensor generating a temperature value of an interior temperature of a vehicle that is greater than or less than the temperature threshold may not initiate an alert if an embedded motion sensor does not detect a motion value from the interior of the vehicle. This can indicate that there is not a safety concern as the lack of motion suggests that no animals or humans are inside the vehicle. Likewise, an embedded temperature sensor generating a temperature value of an interior temperature of a vehicle that is inside the temperature threshold may not initiate an alert when an embedded motion sensor detects a motion value from the interior of the vehicle that is greater than or less than the threshold motion. This can indicate that there is not a safety concern because while motion is detected, the interior temperature of the vehicle is considered safe as determined when the temperature threshold was configured.

For example, at block 660, the flow diagram 613 describes a temperature sensor embedded in the memory device to read a temperature in the interior of a vehicle. The embedded temperature sensor can be configured by a controller coupled to the memory device to operate with a motion sensor embedded in the memory device. At block 670, the flow diagram 613 describes a motion sensor that can read motion in an interior of the vehicle. In the preceding example, the memory device can transmit a signal representing sensor data values from each of the embedded temperature sensor and the embedded motion sensor via the sensor output. The memory device can transmit an indication to the other device coupled to the vehicle responsive to the detected temperature value and the detected motion value being greater than or less than the respective thresholds.

For example, at block 672 the embedded temperature sensor can determine that a temperature greater than or less than the respective temperature threshold has been detected, and at block 674, the flow diagram 613 describes the embedded motion sensor detecting that a motion value is greater than or less than the respective threshold motion. This can indicate the presence of a safety concern and the memory device can be configured to transmit an indication to the other device coupled to the vehicle. For example, at block 676, the flow diagram 613 describes an initiation of an indication. The indication can be in the form of an alert that can initiate the vehicle to sound an audible alarm, transmit a signal to a user, turn vehicle lights on and off, or otherwise create a noticeable disturbance to attract attention to a potentially dangerous situation.

As mentioned, in some examples, the memory device can refrain from transmitting the indication based on a determination of a first embedded sensor detecting a value that is greater than or less than the first configured threshold, and responsive to the second sensor detecting the second value is not greater than or less than the second threshold. In other words, a vehicle may have an interior temperature detected by an embedded temperature sensor that is greater than or less than the respective threshold temperature, but be devoid of any animal, human, or otherwise vulnerable organism and/or item as determined by the embedded motion sensor. In this example, the memory device (e.g., the controller in the memory device) can refrain from transmitting an indication to the other device coupled to the vehicle.

Likewise, a vehicle may have an animal, human, organism, or otherwise vulnerable item occupying the interior of the vehicle as determined by the embedded motion sensor detecting a motion value that is greater than or less than the respective configured threshold associated with a characteristic of relative motion of another object, but the embedded temperature sensor may detect an interior temperature that is within the configured temperature threshold. In this example, the memory device (e.g., the controller in the memory device) can refrain from transmitting an indication to the other device coupled to the vehicle.

While the examples of FIG. 6 describe the utilization of a sensor output, embodiments are not so limited. The examples, described in connection with FIG. 6 can utilize registers (e.g., the registers 224 of FIG. 2) and an I/O logic (e.g., the I/O logic 207 of FIG. 2).

Figure 7:
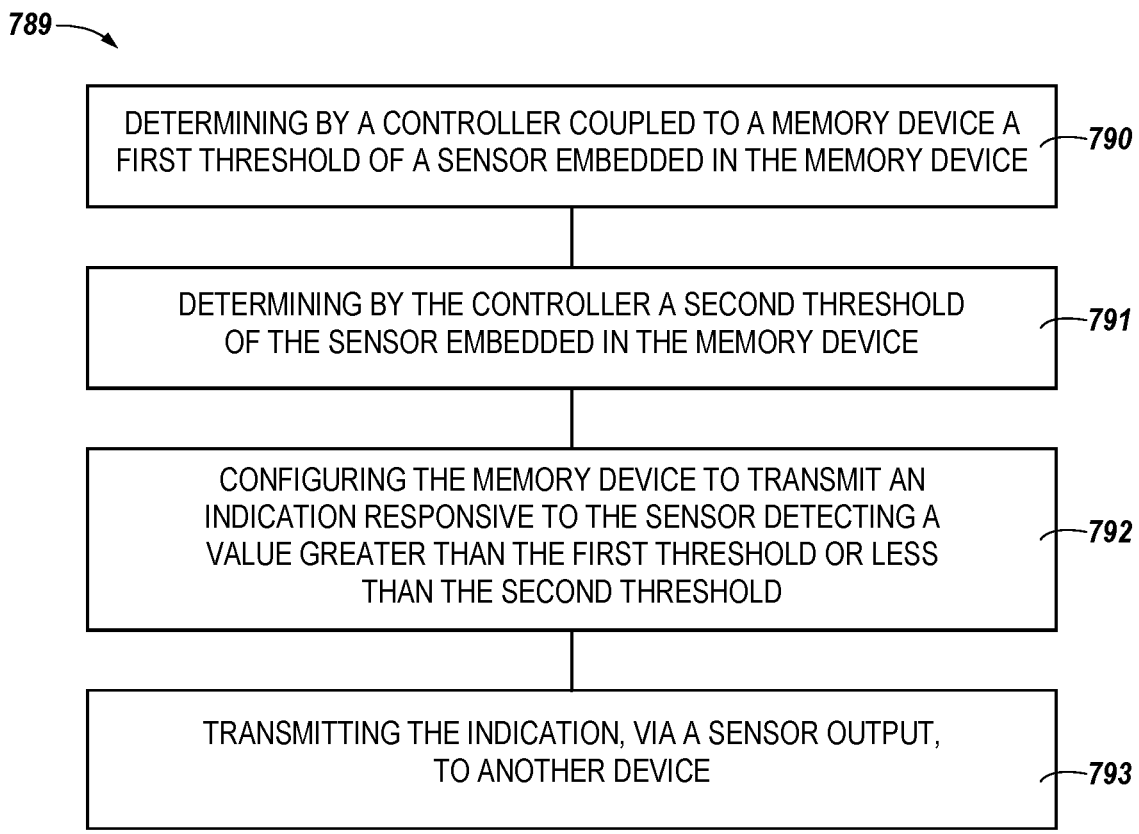
FIG. 7 is a flow diagram representing an example method for using memory device sensors in accordance with a number of embodiments of the present disclosure.

FIG. 7 is a flow diagram representing an example method 789 for using memory device sensors in accordance with a number of embodiments of the present disclosure. At 790, the method 789 includes, determining, by a controller (e.g., the controller 102 of FIG. 1) coupled to a memory device (e.g., memory device 112 of FIG. 1), a first threshold of a sensor (e.g., sensors 130 of FIG. 1) embedded in the memory device. The sensors can be embedded in the memory device and enabled to generate values (e.g., temperature values, motion sensor values, time values, etc.) which can be provided to another device and be accessible to users, or end applications. The sensor in this example, can be a temperature sensor embedded in the memory device and the first threshold can be a high temperature threshold. The controller can configure the temperature sensor to include a high temperature threshold and/or a low temperature threshold.

For example, at 791, the method 789 can include determining, by the controller, a second threshold of the sensor embedded in the memory device. In this example, the second threshold can be a low temperature threshold. The controller can, via the memory device, transmit an indication to the other device responsive to the temperature sensor detecting a temperature that is greater than or less than the first threshold and the second threshold.

For example, at 792, the method 789 includes configuring the memory device to transmit an indication responsive to the sensor detecting a value greater than the first threshold or less than the second threshold. In this example embodiment of method 789, the second threshold can be a low temperature threshold. To provide the other device and/or the vehicle with the indication and/or the sensor data values from the embedded sensors, the memory device can transmit the indication (or sensor data values) via a sensor output dedicated to the embedded sensors of the memory device.

For example, at 793, the method 789 can include transmitting the indication, via a sensor output, to another device (e.g., the device 420 of FIG. 4). The other device may be a part of a vehicle (e.g., the vehicle 403 of FIG. 4) or a computing device that includes hardware and/or software to control the operations of the vehicle. The other device can be directly or indirectly coupled to the sensors embedded in the memory device via the sensor output (e.g., the sensor output 118 of FIG. 1). In some embodiments, the memory device can alter the first and the second threshold of the embedded sensor based on an operation of the other device (e.g., an operation of a device such as a vehicle that includes the other device).

For example, the method 789 can further include detecting, by the controller, a change in an operation of the other device (e.g., a change in operation of the vehicle), altering, by the controller, the first threshold of the sensor embedded in the memory device; and altering, by the controller, the second threshold of the sensor embedded in the memory device, where the first threshold and the second threshold are altered based at least in part on the detected change in operation of the other device. In this example, the other device is coupled to a vehicle and the change in operation is the vehicle changing from a parked operation to a moving operation. The alteration of the sensor threshold can include disabling one or more sensors embedded in the memory device.

While the examples of FIG. 7 describe the utilization of a sensor output, embodiments are not so limited. The examples, described in connection with FIG. 7 can utilize registers (e.g., the registers 224 of FIG. 2) and an I/O logic (e.g., the I/O logic 207 of FIG. 2).

Figure 8:
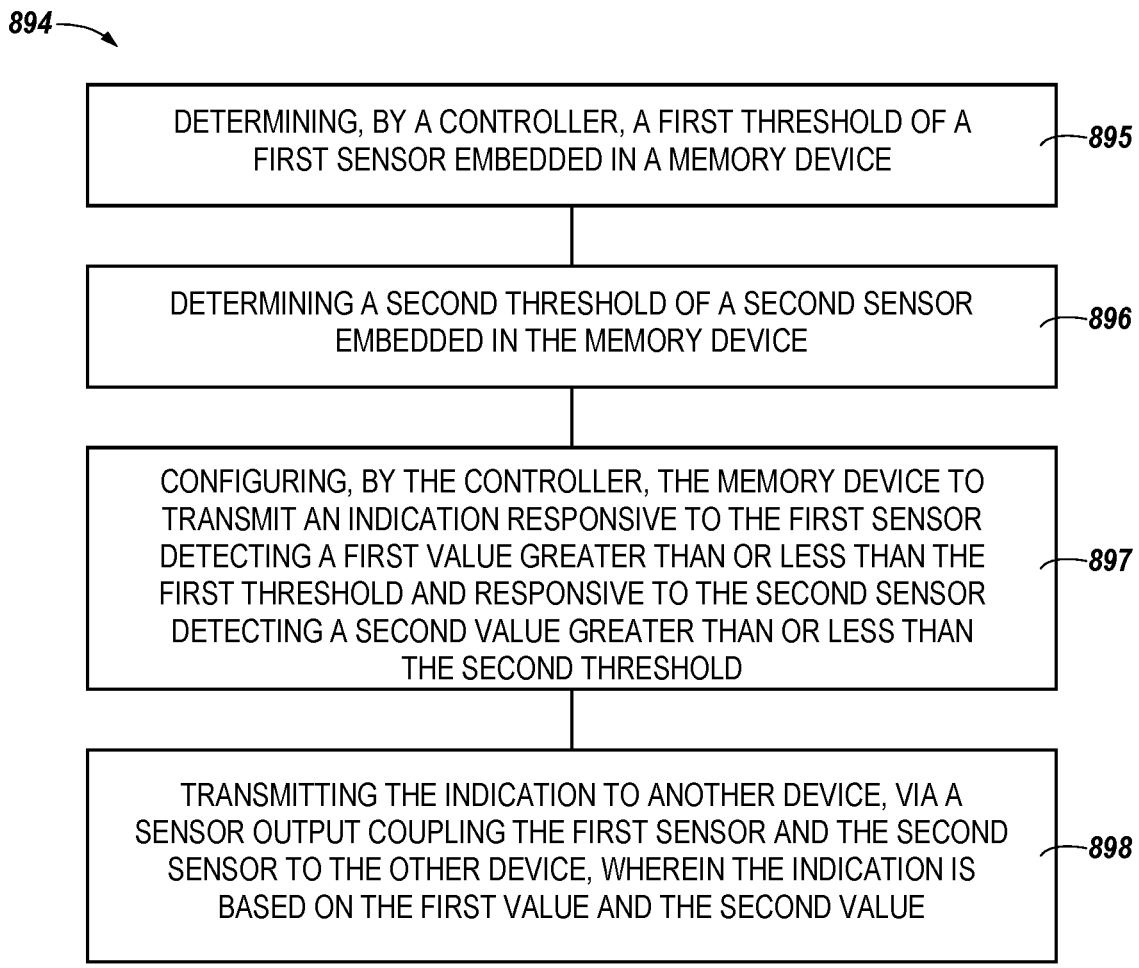
FIG. 8 is a flow diagram representing another example method for using memory device sensors in accordance with a number of embodiments of the present disclosure.

FIG. 8 is a flow diagram representing another example method 894 for using memory device sensors in accordance with a number of embodiments of the present disclosure. At 895, the method 894 includes, determining, by a controller (e.g., the controller 402 of FIG. 4), a first threshold of a first sensor (e.g., 430-1 of FIG. 4) embedded in a memory device (e.g., the memory device 412 of FIG. 4). The sensors can be embedded in the memory device and enabled to generate values (e.g., temperature values, motion sensor values, time values, etc.) which can be provided to another device (e.g., the device 420 of FIG. 4) and be accessible to users, or end applications.

At 896, the method 894 can include determining a second threshold of a second sensor (e.g., the sensor 430-P of FIG. 2) embedded in the memory device. The memory device and/or the controller included in the memory device can be configured to transmit an indication about the values (or the values themselves) generated by the sensors embedded in the memory device to the other device.

For example, at 897, the method 894 can include configuring, by the controller, the memory device to transmit an indication responsive to the first sensor detecting a first value greater than or less than the first threshold and responsive to the second sensor detecting a second value greater than or less than the second threshold. The indication can be transmitted via a sensor output (e.g., the sensor output 418 of FIG. 4). Using this method, the sensors embedded in the memory device can transmit the sensor data values generated to the other device coupled to the vehicle, and/or an indication about the values detected by the embedded sensors can be transmitted to the other device coupled to the a vehicle and/or another device.

For example, at 898, the method 894 can include transmitting the indication to another device, via a sensor output coupling the first sensor and the second sensor to the other device, wherein the indication is based on the first value and the second value. The indication can be an alert indicating that a value collected by the sensors embedded in the memory device is greater than or less than the respective configured thresholds. The other device coupled to the vehicle can, based on this indication, take an action such as heating or cooling a vehicle, sounding an alarm, etc.

While the examples of FIG. 8 describe the utilization of a sensor output, embodiments are not so limited. The examples, described in connection with FIG. 8 can utilize registers (e.g., the registers 224 of FIG. 2) and an I/O logic (e.g., the I/O logic 207 of FIG. 2). While examples of a vehicle are used herein, other examples are contemplated.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    determining by a controller coupled to a memory device a first temperature threshold of a temperature sensor embedded in the memory device;
    determining by the controller a second temperature threshold of the temperature sensor embedded in the memory device;
    determining by the controller a quantity of motion values when a vehicle is in park detected by a motion sensor embedded in the memory device;
    configuring the memory device, via a multiplexer embedded in the memory device, to transmit an indication responsive to the temperature sensor detecting a value greater than the first temperature threshold or less than the second temperature threshold and the motion sensor detecting the quantity of motion values; and
    transmitting the indication, via a sensor output, to another device and data from a memory array of the memory device, via a data input/output bus, to the another device;
    detecting, by the controller, a change in an operation of the other device;
    altering, by the controller, the first temperature threshold of the temperature sensor embedded in memory device; and
    altering, by the controller, the second temperature threshold of the temperature sensor embedded in the memory device, wherein the first temperature threshold and the second temperature threshold are altered based at least in part on the detected change in operation of the other device.

2. The method of claim 1, wherein responsive to receiving the indication via the sensor output, the other device activates a cooling component.

3. The method of claim 1, wherein responsive to receiving the indication via the sensor output, the other device activates a heating component.

4. The method of claim 1, wherein the other device is coupled to the vehicle and the temperature sensor embedded in the memory device coupled to the vehicle, to generate a temperature value of the interior of the vehicle.

5. The method of claim 4, further comprising transmitting, via the sensor output, a signal representing the temperature value to a user interface coupled to the vehicle.

6. The method of claim 4, further comprising:
    configuring, by the controller, the first temperature threshold to be a high temperature threshold of the interior of the vehicle; and
    configuring, by the controller, the second temperature threshold to be a low temperature threshold of the interior of the vehicle.

7. The method of claim 4, further comprising:
    receiving, by the other device coupled to the vehicle, a temperature value via the sensor output, wherein the temperature value is generated by the temperature sensor embedded in the memory device;
    determining that the temperature value is in-between the first temperature threshold and the second temperature threshold; and
    refraining from activating a temperature control component based on the temperature value.

8. The method of claim 1, wherein the other device is coupled to the vehicle and the change in operation is the vehicle changing from the parked operation to a moving operation.

9. A method, comprising:
    determining, by a controller, a first temperature threshold of a first temperature sensor embedded in a memory device;
    determining a second temperature threshold of a second temperature sensor embedded in the memory device;
    determining, by the controller, a vehicle is moving;
    configuring, by the controller, the memory device to transmit an indication responsive to the first temperature sensor detecting a first value greater than or less than the first temperature threshold, responsive to the second temperature sensor detecting a second value greater than or less than the second temperature threshold, and responsive to the vehicle is in motion and data from a memory array of the memory device; and
    transmitting the indication and the data from the memory array to a heating component, by a plurality of registers embedded in the memory device and coupled to an I/O logic control embedded in the memory device, via a data input/output bus coupling the memory device to the heating component, wherein the indication is based on the first value and the second value;
    detecting, by the controller, a change in an operation of the vehicle, wherein the change in operation is the vehicle changing from a moving operation to a parked operation;
    altering, by the controller, the first temperature threshold of the first temperature sensor embedded in memory device; and
    altering, by the controller, the second temperature threshold of the second temperature sensor embedded in the memory device, wherein the first temperature threshold and the second temperature threshold are altered based at least in part on the detected change in operation of the vehicle.

10. The method of claim 9, wherein:
    the heating component is coupled to the vehicle; and
    a motion sensor is embedded in the memory device to detect motion within the interior of the vehicle.

11. The method of claim 10, wherein a quantity of motion values detected by the motion sensor embedded in the memory device within a predetermined period of time.

12. The method of claim 9, further comprising configuring the memory device to refrain from transmitting the indication responsive to the first temperature sensor detecting the first value is greater than or less than the first temperature threshold and responsive to the second sensor detecting the second value is not greater than or less than the second temperature threshold.

13. The method of claim 9, further comprising disabling the second temperature sensor embedded in the memory device based on another detection of a change in operation of the vehicle to moving.

14. A system, comprising:
a wireless communication device configured to communicate using a wireless peer-to-peer or machine-type-communication protocol coupled to a vehicle;
a memory device coupled to the wireless communication device;
a temperature sensor and a motion sensor coupled to a multiplexer embedded in the memory device and coupled to the wireless communication device via a sensor output, the memory device configured to:
determine a first temperature threshold of the temperature sensor embedded in the memory device;
determine a second temperature threshold of the temperature sensor embedded in the memory device;
determine the vehicle is in a parked operation;
transmit an indication, via a sensor output, and data from a memory array of the memory device, via a data input/output bus, to the wireless communication device responsive to the temperature sensor detecting a value that is greater than or less than the respective temperature thresholds and responsive to determining the vehicle is in the parked operation;
detect a change in an operation of the other device; and
alter the first temperature threshold of the temperature sensor embedded in memory device and the second temperature threshold of the temperature sensor embedded in the memory device, wherein the first temperature threshold and the second temperature threshold are altered based at least in part on the detected change in operation of the other device.

15. The system of claim 14, further comprising a controller coupled to the memory device, the controller configured to transmit the indication to the wireless communication device via the sensor output responsive to a determination that a first value detected by the temperature sensor is greater than or less than the first threshold value and responsive to a determination that a second value detected by the motion sensor is greater than or less than the second threshold.

16. The system of claim 14, further comprising a controller coupled to the memory device, the controller configured to cause the memory device to refrain from transmitting the indication to the wireless device via the sensor output responsive to a determination that a first value detected by the temperature sensor is greater than or less than the first threshold value and responsive to a determination that a second value detected by the motion sensor is greater than or less than the second threshold.

* * * * *